United States Patent [19]

Danneels

[11] Patent Number: 5,533,112
[45] Date of Patent: Jul. 2, 1996

[54] VOLUME CONTROL IN DIGITAL TELECONFERENCING

[75] Inventor: Gunner D. Danneels, Beaverton, Oreg.

[73] Assignee: Intel Corporation, Santa Clara, Calif.

[21] Appl. No.: 221,080

[22] Filed: Mar. 31, 1994

[51] Int. Cl.$^6$ ................................................ H04M 3/56
[52] U.S. Cl. .................... 379/202; 379/390; 379/158; 370/62
[58] Field of Search .................. 379/201, 202, 379/387, 388, 390, 203, 204, 205, 206; 370/62

[56] References Cited

U.S. PATENT DOCUMENTS

| | | | |
|---|---|---|---|
| 4,499,578 | 2/1985 | Marouf et al. | 370/62 |
| 4,712,231 | 12/1987 | Julstrom | 379/389 |
| 4,716,585 | 12/1987 | Tompkins et al. | 370/62 |
| 4,730,306 | 3/1988 | Uchida | 370/62 |
| 4,757,494 | 7/1988 | Renner | 370/62 |
| 4,794,591 | 12/1988 | Hoff et al. | 370/62 |
| 4,797,876 | 1/1989 | Ratcliff | 370/62 |
| 4,835,767 | 5/1989 | Renner | 370/62 |
| 5,224,094 | 6/1993 | Maher | 370/62 |
| 5,260,938 | 11/1993 | Hofmann | 370/62 |
| 5,420,860 | 5/1995 | Stevens et al. | 370/62 |

*Primary Examiner*—Jeffery Hofsass
*Assistant Examiner*—Scott Wolinsky
*Attorney, Agent, or Firm*—Steve Mendelsohn; William H. Murray

[57] ABSTRACT

A computer-implemented process and apparatus for processing audio signals for real-time audio conferencing. Digital audio signals from multiple stations of a teleconference are mixed by a control processor while incorporating special control signals that allow participants at each station to control the respective volumes of each of the audio signals received from each of the other stations independently.

14 Claims, 5 Drawing Sheets

$$O_i = K_{i1}(S_1) + K_{i2}(S_2) + \cdots + K_{ij}(S_j) + \cdots + K_{in}(S_n)$$

(WHEN $i = j$, $K_{ii} = 0$)

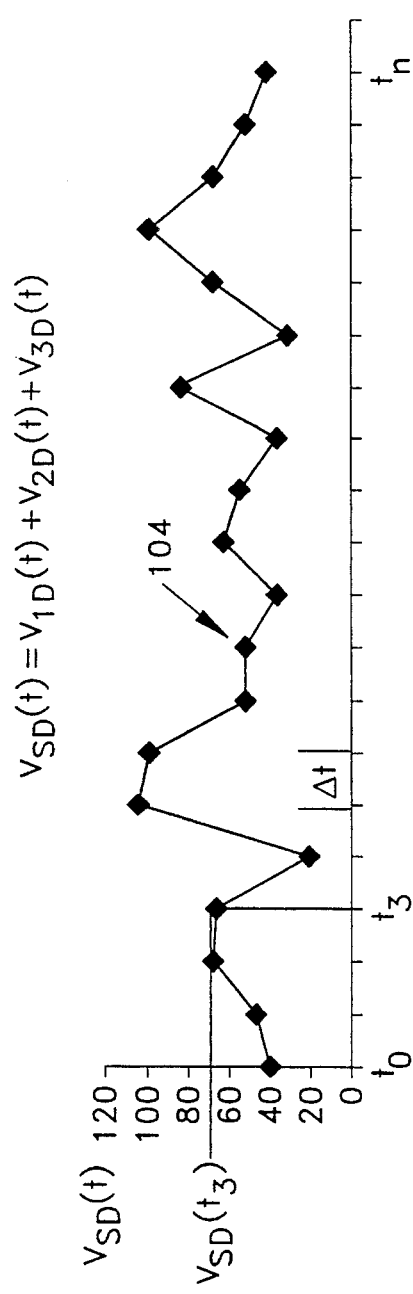
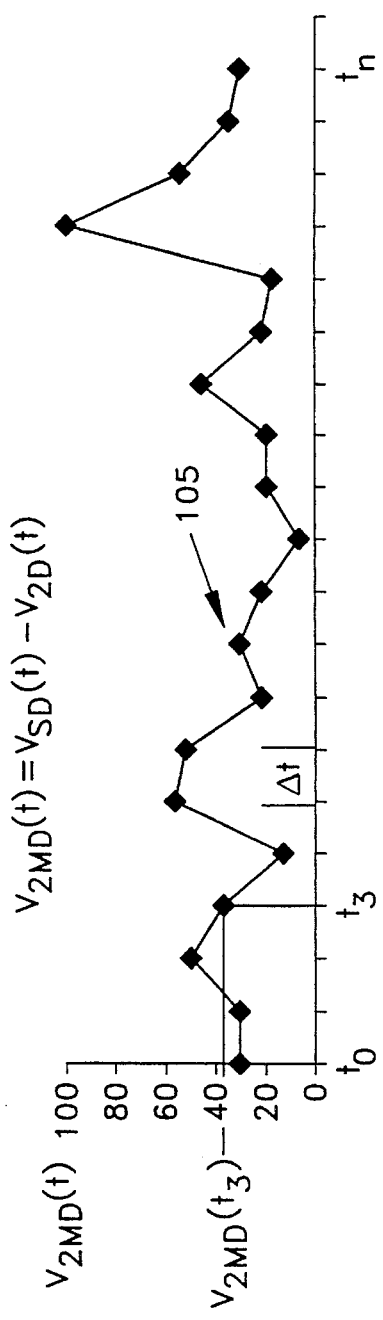
FIG. 1d
FIG. 1e

VOLUME CONTROL IN DIGITAL TELECONFERENCING

BACKGROUND OF THE INVENTION

This invention relates to mixing audio signals, and more particularly to mixing multiple digital audio signals in a multi-party teleconference.

In the continuing search for more reliable audio transmission systems, many different approaches have been employed. One technique that has recently come of age for practical applications, involves conversion of the analog audio (i.e "voice") signal to "sampled and quantized" digital data signals, which are also known as pulse code modulated ("PCM") signals. With this technique, the analog signal is sampled at regular time intervals. Each sample thus acquired is then assigned a digitally-encoded number (e.g., between −128 and +127) which most closely matches the corresponding analog signal level within an assigned range. Thus, for example, an analog voltage range of −1.28 to +1.27 volts can be represented by an 8-bit binary word (having $2^8=256$ possible values) with a resolution of 0.01 volts so that at near-peak levels the digitally-sampled value is within less than one percent of the actual original analog level sampled. Alternatively, for very fine resolution, 16-bit binary words can be used to accomplish 65,536 quantization levels, thus yielding superb accuracy.

By sampling at a rate of at least twice the "highest frequency of interest" of the audio signal (i.e. at or above the "Nyquist rate") the sampled data can later be reconverted to audio with negligible loss of sound quality. The traditional bandwidth used, for example, by telephone companies for transmitting highly "recognizable" speech was 300 to 3000 Hertz. Thus by sampling at a rate of 8000 samples per second (i.e. at more than twice the traditional 3000 Hertz upper frequency level), excellent quality speech transmission can be accomplished.

The major advantage of this type of digital audio transmission is its "repeatability" with little or no noise increase. Thus, for example digital bits can be received, "cleaned up," and retransmitted with the newly-transmitted signal having no difference from the original signal other than a slight time delay. This cannot be accomplished with analog audio systems.

The potential downside to digital audio transmission is that a much broader frequency bandwidth transmission channel is needed to accommodate the digital audio signals than would otherwise be necessary for the corresponding analog audio signals. With the recent advent of very broad bandwidth channels (especially, example, with fibre-optics cables) digital audio transmission has become increasingly practically and economically realizable.

Computer-based teleconferencing, employing personal computers ("PCs") for example, is a natural application of digital audio since the video portions of the transmissions are all digital. Thus the digital transmission systems used for the video data can also be used for the audio signals.

It is important that the audio portion of a teleconference involving several parties be transmitted in a manner that allows each party to the conference to receive the voices of the other conference members only. That is, it is important that the audio signal received by a participant not include that participant's own voice signal so that an otherwise unacceptably annoying delayed echo received at that participant's station is avoided.

It is also highly desirable for each participant to be able to independently control the volume of the signals received from each of the other participants.

SUMMARY OF THE INVENTION

Simultaneously-occurring multiple digital audio signals from separate conference stations are combined, at a central station (i.e. a "bridge") by a volume controller employing a volume function (e.g. most simply by multiplication) and a mixer employing a mixing function (e.g. most simply by addition), into unique digital audio conference streams, and a separate one of these uniquely-modified conference streams is sent to each individual station. Each individual station's received modified conference stream contains the entire conference stream signal except for the original digital audio signal transmitted from that individual station. The volume level of the received signals from each separate station is independently controllable by control signals sent from each separate station, i.e. each individual station can send control signals to the bridge to set the volume separately for each of the other station's audio signals received by that individual station.

DETAILED DESCRIPTION

Figure 1A:
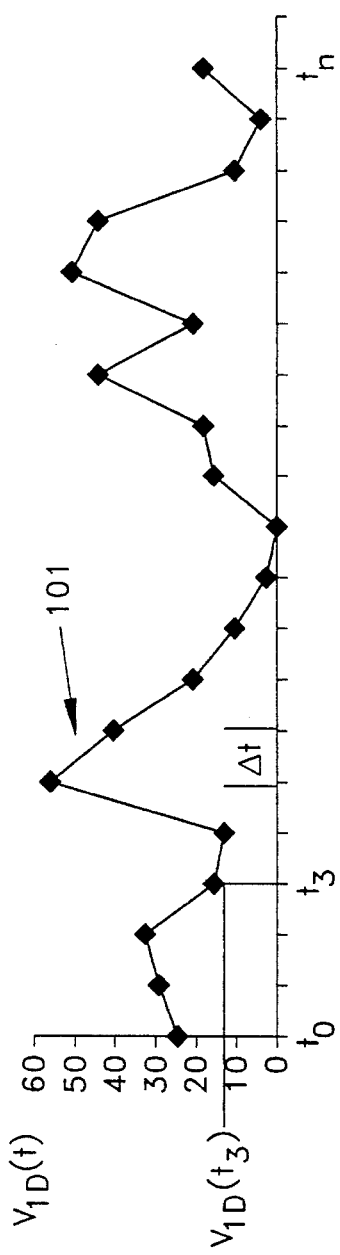
FIGS. 1(a–e) depict example signals wherein mixing and inverse mixing without volume control are accomplished by addition and subtraction respectively.
Figure 1B:
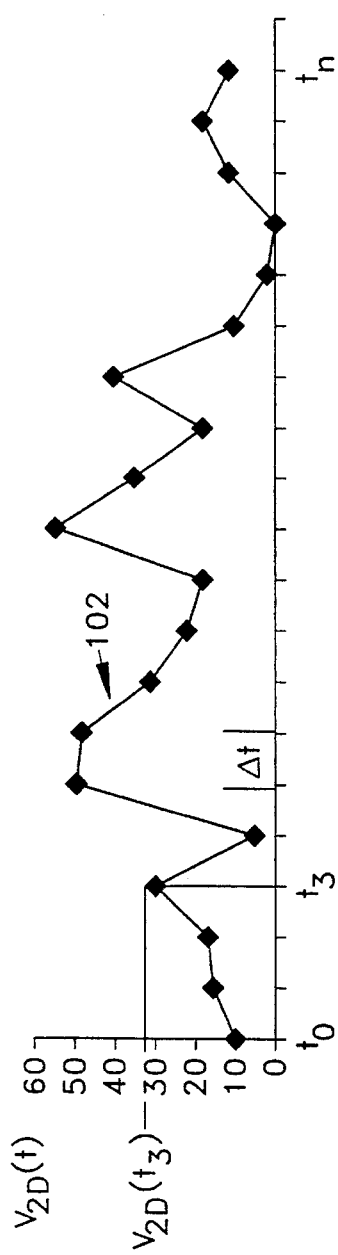
Figure 1C:
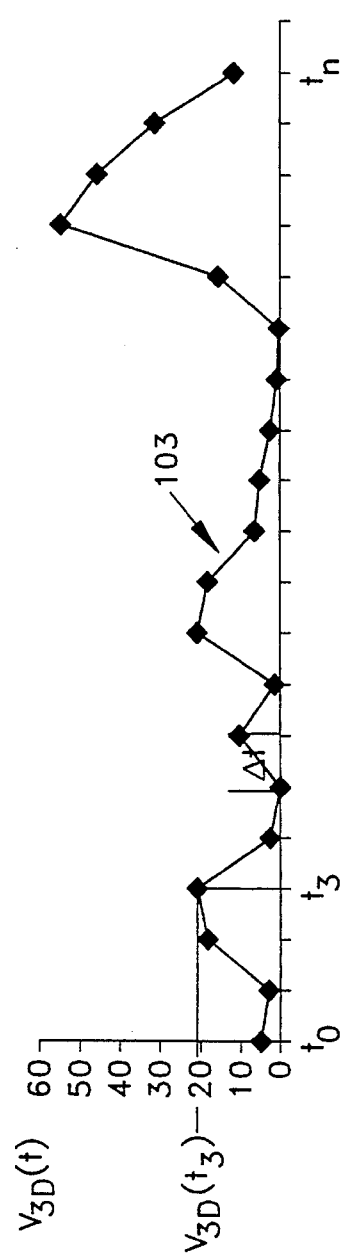

Referring now to FIGS. 1(a–e), therein are depicted analog audio voltage waveforms 101–103 for three stations of an audio conference. As indicated thereon, the waveforms are sampled at regular time intervals $\Delta t$. In FIGS. 1(a–e), $t_0$ represents the time of the initial audio sample and $t_n$ represents the time of the nth audio sample.

For example, at $t=t_3$, the analog waveforms are sampled, quantized, and digitized into 8-bit binary words: $V_{1D}(t_3)=$ 00001111 (i.e. 15), $V_{2D}(t_3)=$00011110 (i.e. 30), and $V_{3D}(t_3)=$ 00010101 (i.e. 21). Waveform 104 represents the summation $V_{SD}(t)$ of waveforms 101–103 after they have been digitized. So, for example, at $t=t_3$, $V_{SD}(t_3)=$01000010 (i.e. 66). Waveform 105 represents the subtraction of waveform 102 from waveform 104. So at $t=t_3$, $V_{2MD}(t)=$00100100 (i.e. 36). The digital data stream is represented by the heavy dots on the respective graphs.

The digital data stream $V_{2MD}(t)$ thus created is intended to be transmitted back to Station 2 of the conference for subsequent digital-to-analog conversion and playout on a loud-speaker or headphone for audible reception by the conference participant(s) at Station 2. In this manner, the participant(s) at Station 2 hear only the audio transmissions from the other two stations, and the respective volumes of the signals from the other two stations heard at Station 2 are controlled only by the respective participants at the other two stations.

More generally, the number of active conference stations is not limited to three, but rather can be any practical number n as desired. Also, the digital encoding is not necessarily accomplished by simple pulse code modulation. The mixing function may be straightforward addition or some other more complex mixing function as desired.

Figure 2:
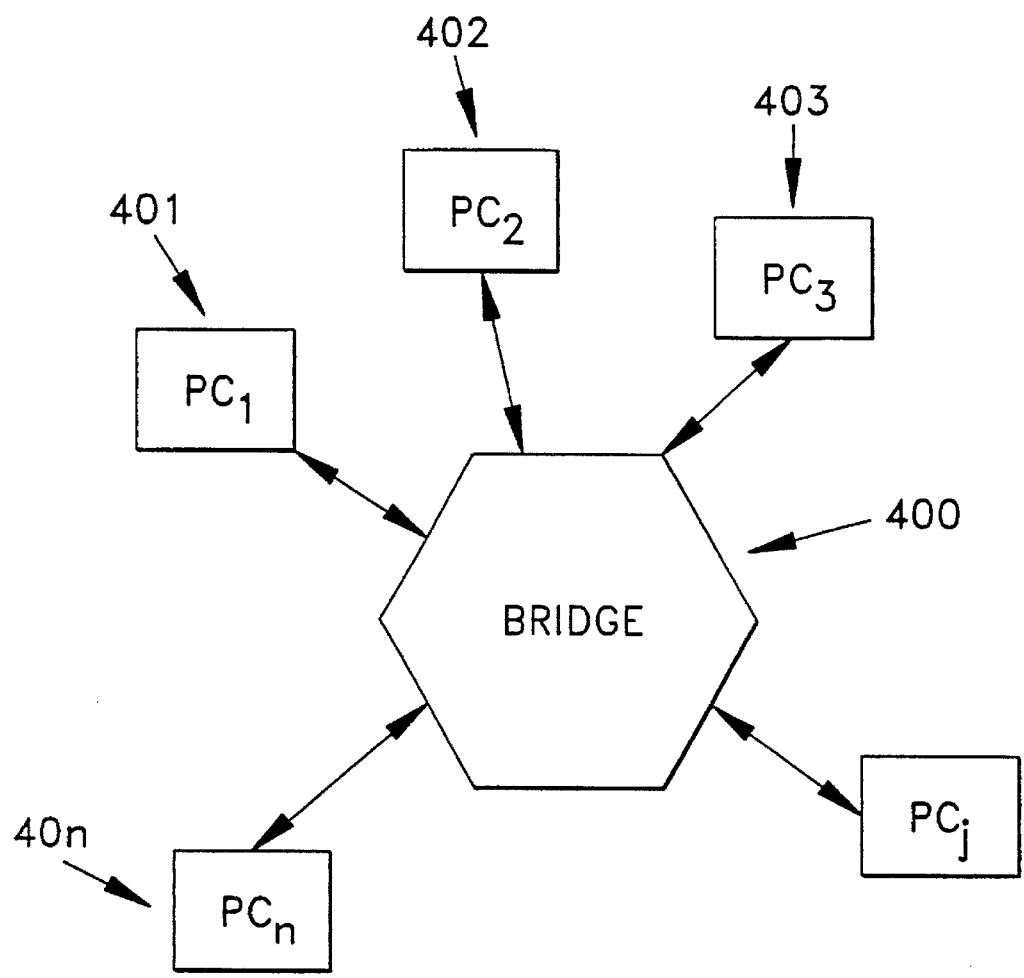
FIG. 2 shows a block diagram of an implementation of the method of the instant invention in a PC-Central Bridge environment.

Once the analog audio signal from each active conference station is encoded in digital form, volume control and mixing and inverse mixing processes can, for example, be accomplished by using a "bridge" or "central" digital processor, (i.e. a "system" digital computer) to perform the necessary data manipulations. A preferred example thereof is the Intel pentium™ processor. Furthermore, the conference stations may comprise personal computers ("PCs") which have the necessary analog-to digital and digital-to-analog conversion capabilities built in and are interconnected with each other via the bridge processor. Such an arrangement is depicted in FIG. 2, wherein the PCs 401-40n are all interconnected via bridge processor 400. As shown, there is two-way communication between each PC and the bridge processor 400, and hence each PC is able to communicate with all the other PCs.

In this environment, there is a digital data input stream $S_j$ to bridge processor 400 from each $PC_j$ which is made up of a sequence of PCM samples $[S_j^1, S_j^2, S_j^3, \ldots]$.

Figure 3:
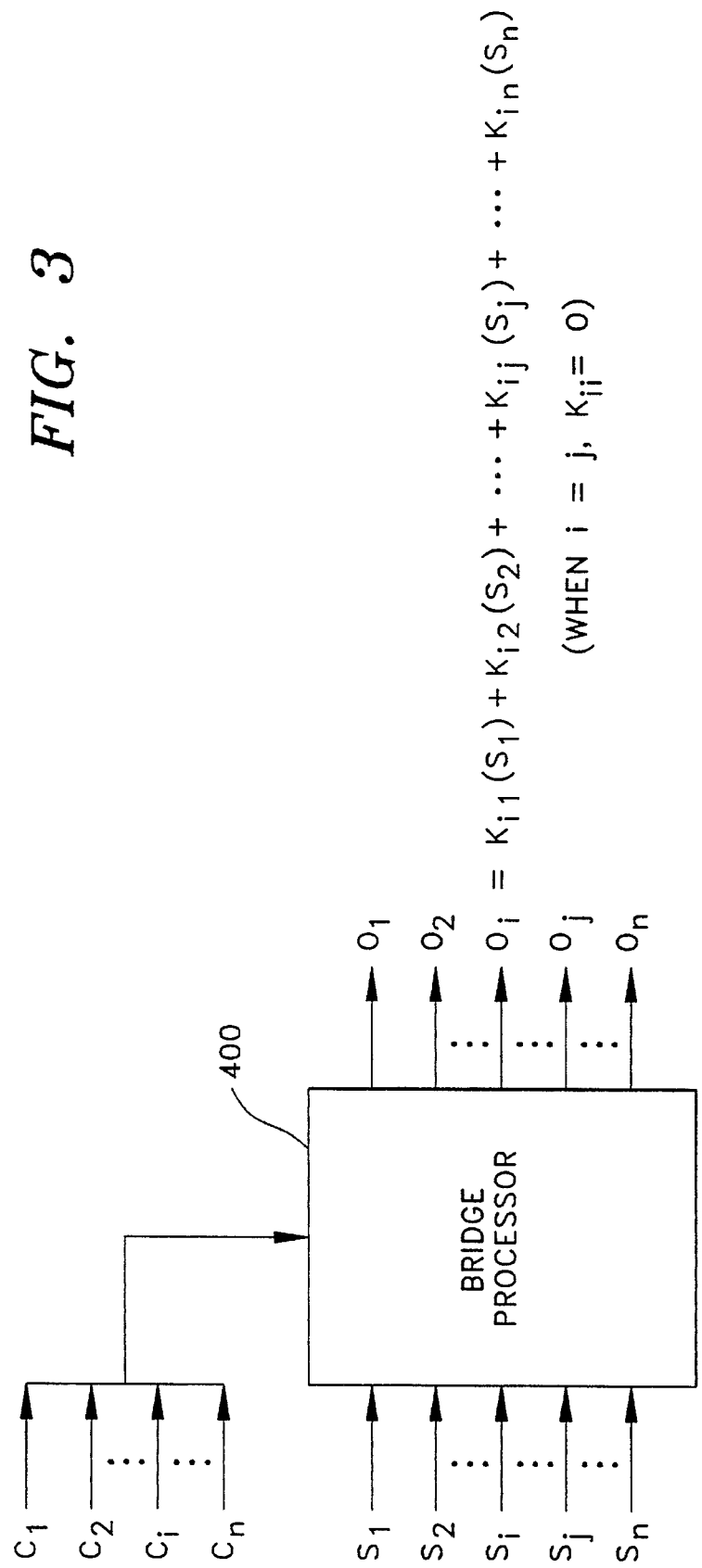
FIG. 3 depicts the general inputs and outputs for a typical bridge processor implementing the method of the instant invention.

The data thus received from all the active PC stations arrives at bridge processor 400 simultaneously in real time. Each PC also includes an interface (not shown) that allows volume control signals, $C_1 \ldots C_i \ldots C_n$, to be transmitted from the respective PCs to the bridge processor. Each of these volume control signals consists of a row of constants $C_i = [K_{i1}, K_{i2}, \ldots, K_{ij}, \ldots, K_{in}]$ which represent the respective volume levels that participant(s) at Station i have set for hearing each of the other station's outputs. In order to assure that Station i does not receive an unacceptable echo of its own output signal, $K_{ii}$ is normally set to be zero. The bridge processor 400 forms a volume matrix from the $C_i$ rows and uses the matrix to transform the set of respective input streams from the participating PC stations into a corresponding set of individually-tailored respective output streams for each of the stations. This process is depicted in FIG. 3, and is characterized mathematically as follows:

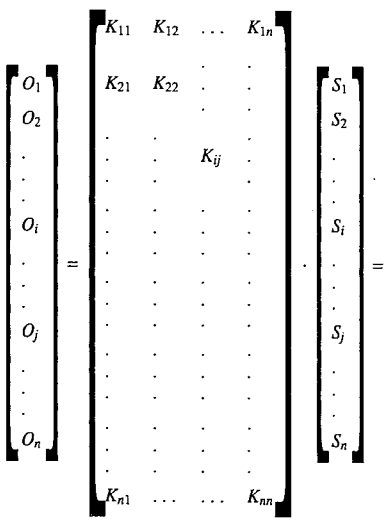

(Where all $K_{ii} = \phi$)

After each sampling time interval, $\Delta t$, the input stream samples $S_1 \ldots S_n]$ from the participating stations change, and the new output stream samples $[O_1 \ldots O_n]$ are generated in real time by a multiplication of the square volume matrix times the column input stream matrix-as shown above. The volume matrix stays constant unless one or more of the participants elects to change one or more of the volume constants, $K_{ij}$, to a preferred value via the above-mentioned volume control interface. The main role of the bridge processor, then, is to accept and store the volume constants from the participating stations, and to do the required real-time matrix multiplications necessary to produce the tail-analog-to-digital ored output streams for digital transmission to the respective stations. The matrix multiplication described above can be accomplished by various algorithms that are well known to those skilled in the art of processor programming.

It should be noted, that in addition to having the constants $K_{ii} = \emptyset$ (to avoid echoes), it is usually also preferable to initially set all the other constants $K_{ij} = 1$ (i.e. for "no change" in volume). This will allow the system to operate without any volume modifications being initially necessary at the participating stations. This corresponds to the reception by the respective stations of a simple addition of all the stations' transmitted digital audio signals except for the transmitted signals of the respective stations as previously discussed and depicted in FIGS. 1(a–e). Subsequent tailoring of the respective rows of the volume matrix by the respective teleconference participants can be accomplished as the conference progresses. The respective constants can, nonetheless, be set at suitable values other than 1 prior to the teleconference by the participants at the respective stations if desired, but the row of constants in the volume matrix corresponding to a particular station can be modified only by participants located at that particular station.

Figure 4:
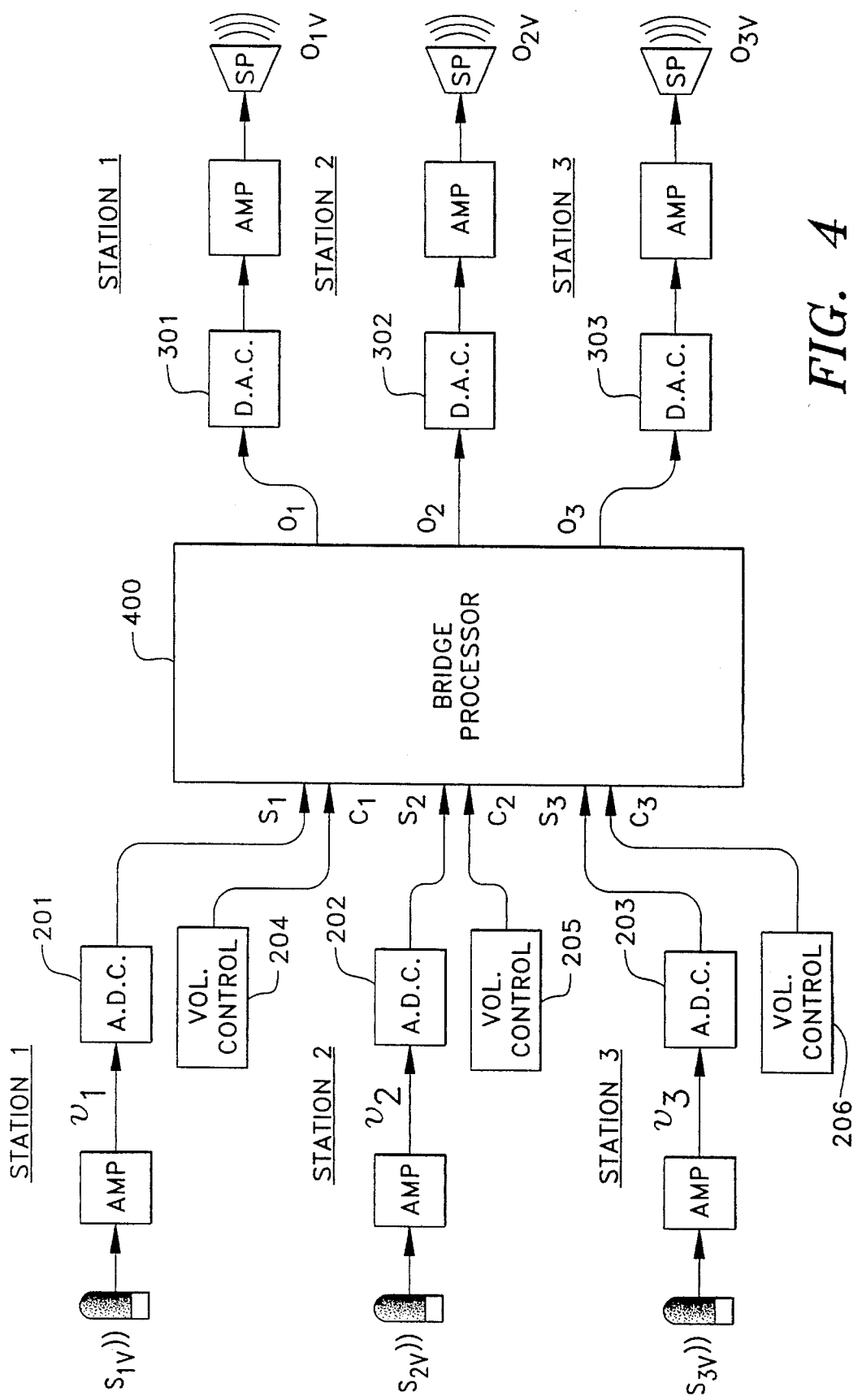
FIG. 4 shows a three-station example implementation of the instant invention.

FIG. 4 depicts an example of the instant invention, showing the main elements for a three-way teleconference. Therein the voice signals $S_{1v}, S_{2v},$ and $S_{3v}$ are picked up by the respective microphones and amplified and then converted by converters 201–203 into digital audio input signals $S_1, S_2,$ and $S_3$ and transmitted to the central bridge processor 400. The output signals of volume control interfaces 204–206 are also transmitted to the bridge processor, thus forming the desired volume matrix. The input digital audio signals $S_1, S_2,$ and $S_3$ are converted by processor 400 into digital audio output signals $O_1, O_2,$ and $O_3$ by implementation of the following matrix multiplication:

$$\begin{bmatrix} O_1 \\ O_2 \\ O_3 \end{bmatrix} = \begin{bmatrix} \phi & K_{12} & K_{13} \\ K_{21} & \phi & K_{23} \\ K_{31} & K_{32} & \phi \end{bmatrix} \cdot \begin{bmatrix} S_1 \\ S_2 \\ S_3 \end{bmatrix}$$

(e.g. $O_2 = K_{21}S_1 + K_{23}S_3$)

The resulting digital output signals are then transmitted back to their respective conference stations where they are converted back to analog signals by digital-to-analog converters 301–303 and amplified before being played out on their respective receiving electromechanical sound transducers (e.g. loudspeakers or headphones or receiver phones) as audio outputs $O_{1v}$, $O_{2v}$, and $O_{3v}$, respectively.

The volume constants can be represented as floating point numbers, or, for more computing efficiency, they can be characterized as fixed point numbers so that the required multiplications become integer multiplications. Also, on some processors this use of fixed point volume constants could allow the necessary multiplications to be accomplished by table look-ups.

The examples given above employ standard pulse code modulation (PCM) with the volume control being accomplished by simple multiplication and the mixing being implemented by simple addition. The concept of this invention includes the use of a generalized mixing function μ and a generalized volume function β.

Consider an audio stream from a general active station, $PC_i$, which is made up of a sequence of digital audio samples $[S_p^1, S_p^2, S_p^3 ---]$, wherein the numerals represent the position in the audio stream and p represents the station that is sending the sample. Also, consider the mixing function μ to be a function that produces a mixed sound sample m from two input sound samples $S_1$ and $S_2$ such that $m=\mu(S_1, S_2)$. Further consider the volume function β to be a function that produces a modified sound sample $S_{AK}$ from an input sound sample $S_A$ and a volume factor K such that $S_{AK}=\beta(K, S_A)$. Thus sample $S_A$ is altered to sound louder or softer by an amount determined by the function β and the applied volume factor K to produce $S_{AK}$. (So, for example, as previously discussed, for PCM sound μ is simple addition and β is simple multiplication.)

Since there are n active stations in the teleconference there will be n audio streams sent to the central processor bridge. The bridge produces n respective mixed output streams which have been volume-adjusted and are to be returned to the respective stations for playout.

Given the conditions of the proceeding paragraph, the n unique mixed audio output streams are created by the central processor bridge for the n respective active stations as follows:

The n mixed output streams are made up of individual samples $O_q^p$ where p is the position in the output stream and q is the station that will be receiving the sample. The input sound streams from the various stations are also made up of corresponding individual samples $S_q^p$. By assigning the volume factors as $K_{ij}$, corresponding to the picked volume factor for station i receiving station j, the output streams are calculated as follows:

For reception by each active station i in the conference create sample $O_i^p$ as follows:

Set $m$ = silence
For each active station $j \neq i$, do $m = \mu(m, \beta(K_{ij}, S_j^p))$
$O_i^p = m$.

Although the invention has been herein described with specific examples, numerous modifications and practical variations (such as the use of various volume and mixing functions) may occur to those skilled in the art without departing from the spirit and scope of the appended claims.

What is claimed is:

1. A computer-implemented process for processing audio signals, comprising the steps of:

(a) receiving a plurality of input streams $\{S_1, \ldots, S_{n-1}, S_n\}$ of audio signals from a plurality of stations participating in a real-time audio conference;

(b) generating a plurality of output streams from the plurality of input streams, wherein each output stream $O_i$ is generated as a sum of products of each input stream and a plurality of corresponding volume-control factors $\{K_1, \ldots, K_{n-1}, K_n\}$, such that:

$$O_i = K_{i1}S_1 + \ldots + K_{i(n-1)}S_{n-1} + K_{in}S_n$$

wherein at least one volume-control factor is independent of at least one other corresponding volume-control factor used to generate a different output stream; and (c) transmitting the output streams to the stations, wherein each output stream is transmitted to a corresponding station.

2. The process of claim 1, wherein each volume-control factor is independent of all other volume-control factors.

3. The process of claim 1, wherein the input streams of audio signals comprise pulse code modulated audio signals.

4. The process of claim 1, wherein each output stream $O_i$ is independent of its corresponding input stream.

5. The process of claim 1, wherein:

step (a) further comprises the step of receiving from one or more of the stations one or more volume-control signals representative of one or more of the volume-control factors; and step (b) further comprises the step of adjusting the one or more volume-control factors based on the one or more volume-control signals.

6. The process of claim 5, wherein step (b) comprises the step of adjusting the one or more volume-control factors during the audio conference.

7. The process of claim 6, wherein:

each volume-control factor is independent of all other volume-control factors;

the input streams of audio signals comprise pulse code modulated audio signals; and each output stream $O_i$ is independent of its corresponding input stream.

8. An apparatus for processing audio signals, comprising:

(a) means for receiving a plurality of input streams $\{S_1, \ldots, S_{n-1}, S_n\}$ from a plurality of stations participating in a real-time audio conference;

(b) means for generating a plurality of output streams from the plurality of input streams, wherein each output stream $O_i$ is generated as a sum of products of each input stream and a plurality of corresponding volume-control factors $\{K_1, \ldots, K_{n-1}, K_n\}$, such that:

$$O_i = K_{i1}S_1 + \ldots + K_{i(n-1)}S_{n-1} + K_{in}S_n$$

wherein at least one volume-control factor is independent of at least one other corresponding volume-control factor used to generate a different output stream; and (c) means for transmitting the output streams to the stations, wherein each output stream is transmitted to a corresponding station.

9. The apparatus of claim 8, wherein each volume-control factor is independent of all other volume-control factors.

10. The apparatus of claim 8, wherein the input streams of audio signals comprise pulse code modulated audio signals.

11. The apparatus of claim 8, wherein each output stream $O_i$ is independent of its corresponding input stream.

12. The apparatus of claim 8, wherein:
  means (a) receives from one or more of the stations one or more volume-control signals representative of one or more of the volume-control factors; and
  means (b) adjusts the one or more volume-control factors based on the one or more volume-control signals.

13. The apparatus of claim 12, wherein means (b) adjusts the one or more volume-control factors during the audio conference.

14. The apparatus of claim 13, wherein:
  each volume-control factor is independent of all other volume-control factors; the input streams of audio signals comprise pulse code modulated audio signals; and
  each output stream $O_i$ is independent of its corresponding input stream.

* * * * *

UNITED STATES PATENT AND TRADEMARK OFFICE
CERTIFICATE OF CORRECTION

PATENT NO.    : 5,533,112
DATED         : July 2, 1996
INVENTOR(S)   : Gunner D. Danneels It is certified that error appears in the above-identified patent and that said Letters Patent is hereby corrected as shown below:

Column 6, line 49, before "from" insert --of audio signals--.

Column 6, line 58 (equation) delete "-$S_{n-1}$" and insert therefor --$S_{n-1}$--.

Signed and Sealed this

Fifteenth Day of April, 1997

Attest:

BRUCE LEHMAN

*Attesting Officer*     *Commissioner of Patents and Trademarks*